(12) United States Patent
Monga et al.

(10) Patent No.: US 10,783,306 B2
(45) Date of Patent: Sep. 22, 2020

(54) SIMULATION METHODS AND SYSTEMS FOR PREDICTING SER

(71) Applicant: Samsung Electronics Co., Ltd., Suwon-si, Gyeonggi-do (KR)

(72) Inventors: Udit Monga, Hwaseong-si (KR); Jong Wook Jeon, Suwon-si (KR); Ken Machida, Yokohama (JP); Ui Hui Kwon, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 302 days.

(21) Appl. No.: 15/645,227

(22) Filed: Jul. 10, 2017

(65) Prior Publication Data

US 2018/0121587 A1 May 3, 2018

(30) Foreign Application Priority Data

Oct. 27, 2016 (KR) .................. 10-2016-0140943

(51) Int. Cl.
*G06F 30/367* (2020.01)
*H01L 29/78* (2006.01)
*H01L 27/088* (2006.01)
*G06F 17/18* (2006.01)
*G06F 111/20* (2020.01)
*H01L 23/556* (2006.01)
(Continued)

(52) U.S. Cl.
CPC ............ *G06F 30/367* (2020.01); *G06F 17/18* (2013.01); *H01L 27/0886* (2013.01); *H01L 29/7851* (2013.01); *G06F 2111/20* (2020.01); *H01L 23/556* (2013.01); *H01L 23/60* (2013.01); *H01L 29/0669* (2013.01); *H01L 29/785* (2013.01)

(58) Field of Classification Search
USPC ........................................................ 716/115
See application file for complete search history.

(56) References Cited

U.S. PATENT DOCUMENTS

| 6,914,447 B2 | 7/2005 | Baumann |
| 7,499,308 B2 | 3/2009 | Chen et al. |

(Continued)

FOREIGN PATENT DOCUMENTS

| JP | 2004/153152 A | 5/2004 |
| JP | 2006/013008 A | 1/2006 |
| JP | 4374792 B2 | 12/2009 |

*Primary Examiner* — Eric D Lee
(74) *Attorney, Agent, or Firm* — Harness, Dickey & Pierce, P.L.C.

(57) ABSTRACT

A soft error rate (SER) associated with a design of a semiconductor circuit may be predicted based on implementing a simulation associated with the design. The simulation may include generating a simulation environment based on information indicating the design, performing a particle strike simulation based on the simulation environment to generate charge deposition information, and calculating a collected charge quantity from the charge deposition information. A determination may be made whether the SER predicted based on the collected charge quantity at least meets a threshold. The design may be modified, and the simulation repeated, if the predicted SER value meets a threshold value. A semiconductor circuit may be manufactured based on the design if the predicted SER value is less than the threshold value.

20 Claims, 13 Drawing Sheets

(51) Int. Cl.
  *H01L 23/60* (2006.01)
  *H01L 29/06* (2006.01)

(56) References Cited

U.S. PATENT DOCUMENTS

| | | | |
|---|---|---|---|
| 8,582,352 B2* | 11/2013 | Liaw | G11C 11/412 |
| | | | 365/154 |
| 8,633,109 B2 | 1/2014 | Lee et al. | |
| 8,639,992 B2 | 1/2014 | Haufe et al. | |
| 2005/0116361 A1* | 6/2005 | Fukui | G11C 11/412 |
| | | | 257/1 |
| 2007/0044003 A1 | 2/2007 | Doweck et al. | |
| 2007/0226572 A1* | 9/2007 | Zhang | G06F 11/261 |
| | | | 714/742 |
| 2008/0077376 A1* | 3/2008 | Belhaddad | G06F 17/5009 |
| | | | 703/13 |
| 2008/0281572 A1 | 11/2008 | Puri et al. | |
| 2010/0169850 A1* | 7/2010 | Turner | G06F 17/5036 |
| | | | 716/115 |
| 2013/0132056 A1 | 5/2013 | Toba et al. | |

* cited by examiner

SIMULATION METHODS AND SYSTEMS FOR PREDICTING SER

CROSS-REFERENCE TO RELATED APPLICATIONS

This application claims priority, under 35 § U.S.C. 119, from Korean Patent Application No. 10-2016-0140943 filed on Oct. 27, 2016 in the Korean Intellectual Property Office, the contents of which in its entirety are herein incorporated by reference.

BACKGROUND

1. Technical Field

The present inventive concepts relate to simulation methods and systems for predicting a soft error rate (SER).

2. Description of the Related Art

A soft error, particularly, a chip-level soft error, may occur when particles strike a chip, where the chip may include a logic circuit and/or a memory circuit. The soft error may cause data loss at the chip due to ionization due to cosmic rays and radioactive emission. In order to deal with such a soft error, the accuracy of the prediction of the soft error rate (SER) may be improved.

In particular, a SER prediction technique, which is suitable for a three-dimensional (3D) semiconductor device in which a channel is formed according to a three-dimensional structure unlike a conventional planar semiconductor device, may be used.

SUMMARY

Aspects of the present inventive concepts provide a particle strike simulation method for enhancing the accuracy of the SER prediction for a 3D semiconductor device.

Aspects of the present inventive concepts also provide a particle strike simulation system for enhancing the accuracy of the SER prediction for a 3D semiconductor device.

However, aspects of the present inventive concepts are not restricted to the example embodiments set forth herein. The above and other aspects of the present inventive concepts will become more apparent to one of ordinary skill in the art to which the present inventive concepts pertains by referencing the detailed description of the present inventive concepts given below.

According to some example embodiments, a method may include: receiving layout and netlist information associated with a design of a semiconductor circuit, generating a simulation environment based on the layout and netlist information, performing a particle strike simulation based on the simulation environment to generate charge deposition information associated with the design of the semiconductor circuit, calculating a collected charge quantity associated with the design of the semiconductor circuit based on the charge deposition information, and manufacturing the semiconductor circuit based on the calculated collected charge quantity. The semiconductor circuit may include a three-dimensional (3D) semiconductor device. The simulation environment may include a representation of the semiconductor circuit according to the design of the semiconductor circuit.

According to some example embodiments, a system may include a memory storing a program of instructions, and a processor. The processor may be configured to execute the program of instructions to receive layout and netlist information associated with a design of a semiconductor circuit, generate a simulation environment based on the layout and netlist information, perform a particle strike simulation based on the simulation environment to generate charge deposition information associated with the design of the semiconductor circuit, calculate a collected charge quantity associated with the design of the semiconductor circuit based on the charge deposition information, and manufacture the semiconductor circuit based on the calculated collected charge quantity. The semiconductor circuit may include a 3D semiconductor device. The simulation environment may include a representation of the semiconductor circuit according to the design of the semiconductor circuit.

According to some example embodiments, a method may include receiving information indicating a design of a semiconductor circuit, generating a simulation environment based on the information, performing a particle strike simulation based on the simulation environment to determine a soft error rate (SER) associated with the design of the semiconductor circuit, and manufacturing the semiconductor circuit according to the design of the semiconductor circuit, based on a determination that the SER is less than a threshold value. The semiconductor circuit may include a three-dimensional (3D) semiconductor device. The simulation environment may include a representation of the semiconductor circuit.

According to some example embodiments, a method may include receiving information indicating a design of a semiconductor circuit, generating a simulation environment based on the information, performing a particle strike simulation based on the simulation environment to determine a soft error rate (SER) associated with the design of the semiconductor circuit, modifying the design of the semiconductor circuit to establish a modified design, and generating information indicating the modified design, based on a determination that the SER at least meets a threshold value, implementing the generating and the performing, based on the information indicating the modified design, to determine a SER associated with the modified design, and manufacturing the semiconductor circuit according to the modified design, based on a determination that the SER associated with the modified design is less than a threshold value. The semiconductor circuit may include a three-dimensional (3D) semiconductor device. The simulation environment may include a representation of the semiconductor circuit.

BRIEF DESCRIPTION OF THE DRAWINGS

The above and other aspects and features of the present inventive concepts will become more apparent by describing in detail example embodiments thereof with reference to the attached drawings, in which.

DETAILED DESCRIPTION OF THE EMBODIMENTS

The term "unit" or "module", as used herein, means, but is not limited to, a software or hardware component, such as a field programmable gate array (FPGA) or an application specific integrated circuit (ASIC), which performs certain tasks. A unit or module may advantageously be configured to reside in the addressable storage medium (e.g., a non-transitory computer readable storage medium) and configured to execute on one or more processors. Thus, a unit or module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units or modules may be combined into fewer components and units or modules or further separated into additional components and units or modules.

Figure 1:
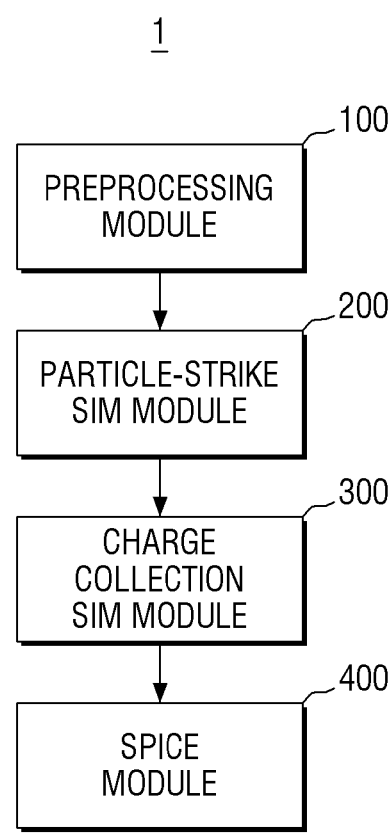
FIG. 1 is a block diagram of a simulation system according to some example embodiments of the present inventive concepts.

FIG. 1 is a block diagram of a simulation system according to some example embodiments of the present inventive concepts.

Referring to FIG. 1, a simulation system 1 according to some example embodiments of the present inventive concepts includes a preprocessing module 100, a particle strike simulation module 200, and a charge collection simulation module 300. In some example embodiments of the present inventive concepts, the simulation system 1 may further include a Simulation Program Integrated Circuit Emphasis (SPICE) module 400.

In some example embodiments, the simulation system 1 may be at least partially implemented by an electronic device, including the electronic device 1100 illustrated in FIG. 11 and described with reference thereto, below. For example, the simulation system 1 may be implemented at the electronic device 1100 based on a processor 1130 of the electronic device 1100 executing a program of instructions stored on a memory 1120 of the electronic device.

The preprocessing module 100 may receive layout and netlist information of ("associated with") a semiconductor circuit including a three-dimensional (3D) semiconductor device, and the preprocessing module 100 creates a simulation environment based on the layout and netlist information. Such a simulation environment may include generating an environment that simulates the semiconductor circuit and/or the 3D semiconductor device. The simulation environment may simulate the semiconductor circuit and/or the 3D semiconductor device based on a design of the semiconductor circuit and/or the 3D semiconductor device, where the design may be indicated by the received layout and netlist information. Accordingly, the simulation environment may include a representation (simulation) of the semiconductor circuit and/or 3D semiconductor device, where the representation is based on a design of the semiconductor circuit and/or 3D semiconductor device.

Specifically, based on the layout and netlist information, the preprocessing module 100 may detect the position of a sensitive node or sensitive region in the design of the semiconductor circuit and/or the 3D semiconductor device for measuring the charge quantity and creates a 3D simulation environment necessary for a particle strike simulation that simulates a particle strike on at least a portion of the semiconductor circuit and/or the 3D semiconductor device that includes the sensitive node or sensitive region.

The simulation environment includes at least one of front-end-of-line (FEOL) layer information, middle-of-line (MOL) layer information and back-end-of-line (BEOL) layer information, and may be used to apply a Monte-Carlo simulation technique which will be described below.

In some example embodiments of the present inventive concepts, the 3D semiconductor device includes a FinFET semiconductor device, a nanowire semiconductor device, a nanosheet semiconductor device, and the like, but the present inventive concepts are not limited thereto.

The particle strike simulation module 200 may perform a particle strike simulation, based on the simulation environment created by the preprocessing module 100, to generate charge deposition information.

Specifically, the particle strike simulation module 200 generates, in the simulation environment, a simulation of particles such as alpha particles and neutrons, sets the initial position and velocity of the simulated particles, and then, performs a simulation to cause the particles to strike the simulated 3D semiconductor device that is represented in the simulation environment. Particularly, the particle strike simulation module 200 may perform a particle strike simulation for a sensitive node or sensitive region of the simulated semiconductor circuit and/or 3D semiconductor device detected by the preprocessing module 100.

In some example embodiments of the present inventive concepts, the particle strike simulation module 200 uses a Monte-Carlo simulation technique for the particle strike simulation, but the present inventive concepts are not limited thereto.

The particle strike simulation module 200 may calculate the energy distribution after the particle strike using the result of the particle strike simulation, and may provide it as the charge deposition information to the charge collection simulation module 300.

The charge collection simulation module 300 may calculate the collected charge quantity from the charge deposition information generated from the particle strike simulation module 200. Particularly, the charge collection simulation module 300 may calculate the collected charge quantity for the sensitive node or sensitive region detected by the preprocessing module 100.

Specifically, the charge collection simulation module 300 may model the charge collection distribution using a modeling framework specialized for the 3D semiconductor device, and then may calculate the collected charge quantity based thereon.

The SPICE module 400 may receive the layout and netlist information and the simulation environment, and may perform a Simulation Program with Integrated Circuit Emphasis (SPICE) simulation to estimate failure-in-time (FIT) associated with at least a portion of the semiconductor circuit and/or the 3D semiconductor device being simulated in the simulation environment. The values generated by the SPICE module 400 may include SER prediction result values, where the SER prediction result value may indicate a risk (e.g., a value indicating the SER) associated with a soft error resulting from a particle strike (e.g., particle strike-induced soft error) to a semiconductor circuit and/or 3D semiconductor device having a design that corresponds to (e.g., is associated with) the design used to create the representation used in the simulation environment. In some example embodiments, the SER value may be a failure-in-time (FIT) value and/or a Mean Time Between Failures (MTBF) value.

In some example embodiments of the present inventive concepts, the SPICE module 400 may provide the SER prediction result obtained by performing the SPICE simulation in various expressions such as Mean Time Between Failures (MTBF) in addition to the FIT.

According to some example embodiments of the present inventive concepts, the accuracy of the SER prediction for the 3D semiconductor device can be increased, thereby reducing data loss due to a soft error caused by cosmic rays and radioactive emission.

In some example embodiments, based on the SER prediction result (e.g., the SER prediction result value), the design of the semiconductor circuit and/or the 3D semiconductor device and/or the design of an electronic device in which the semiconductor circuit and/or the 3D semiconductor device is located may be modified. For example, where the SER prediction result indicates that a 3D semiconductor device design is excessively vulnerable to particle-strike induced soft errors (e.g., the SER, MIT and/or MTBF values at least meet threshold values, respectively), the 3D semiconductor device design may be modified, and the simulation and SER prediction result obtainment provided by the simulation system 1 may be re-executed on the modified design. The simulation system 1 may, in some example embodiments, implement an iterative process where the design is simulated, SER prediction results are obtained, and the design is modified and re-simulated accordingly, until the SER prediction results for a modified 3D semiconductor device design indicate that the 3D semiconductor device design is sufficiently resistant to particle-strike induced soft error (e.g., the SER, MIT and/or MTBF values at least meet threshold values, respectively), In some example embodiments, upon a determination that a design (e.g., 3D semiconductor device design, semiconductor circuit design, electronic device design, etc.) is sufficiently resistant to particle-strike induced soft errors based on the SER prediction result (e.g., the SER, MIT and/or MTBF values are less than threshold values, respectively), at least a 3D semiconductor device and/or semiconductor circuit may be fabricated ("manufactured") according to the design. Thus, the simulation system 1 may at least partially mitigate the problem of fabricated semiconductor circuits and/or 3D semiconductor devices being susceptible to soft errors, thereby enabling the fabrication of semiconductor circuits and/or 3D semiconductor devices, and in some example embodiments electronic devices including the semiconductor circuits and/or 3D semiconductor devices, having reduced susceptibility to soft errors and thus having improved reliability and/or performance. As a result, an issue of particle strike-induced soft errors in semiconductor circuits may be at least partially mitigated based on implementing at least the simulation system with regard to a design of a semiconductor circuit and/or 3D semiconductor device.

Figure 2:
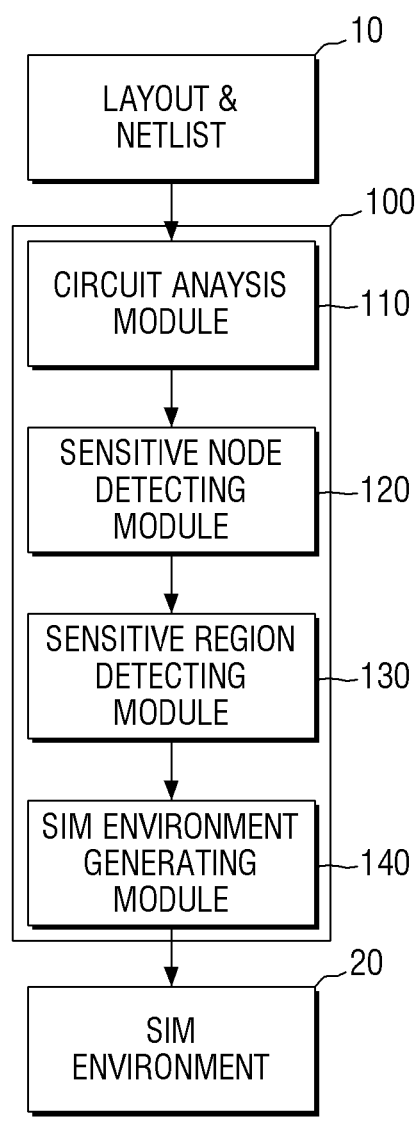
FIG. 2 is a block diagram illustrating a preprocessing module of the simulation system according to some example embodiments of the present inventive concepts.

FIG. 2 is a block diagram illustrating the preprocessing module of the simulation system according to some example embodiments of the present inventive concepts. In some example embodiments, preprocessing module 100 shown in FIG. 2 may be implemented in simulation system 1 as shown in FIG. 1.

Referring to FIG. 2, the preprocessing module 100 according to some example embodiments of the present inventive concepts includes a circuit analysis module 110, a sensitive node detecting module 120, a sensitive region detecting module 130 and a simulation environment generating module 140.

The circuit analysis module 110 receives layout and netlist information 10, and analyzes the semiconductor circuit including a 3D semiconductor device based thereon. The layout and netlist information 10 may include a design of the semiconductor circuit and/or the 3D semiconductor device. The design may be referred to herein as a representation of the semiconductor circuit and/or a representation of the 3D semiconductor device.

For example, the circuit analysis module 110 may analyze circuit components included in the design of the semiconductor circuit and/or the 3D semiconductor device, such as an input terminal, an output terminal, a power supply node, and a ground node of the semiconductor circuit and a connection relationship thereof.

The circuit analysis module 110 may also analyze various information associated with the semiconductor circuit including shared diffusion, the type of the 3D semiconductor device, the information associated with the 3D structure, the location of the diffusion, and the like.

The sensitive node detecting module 120 may detect a sensitive node corresponding to a target node in (e.g., "associated with") the representation of the semiconductor circuit and/or the 3D semiconductor device for measuring the charge quantity from the layout and netlist information 10.

The sensitive node may be determined according to the semiconductor circuit. For example, when the semiconductor circuit corresponds to a Static Random Access Memory (SRAM), the sensitive node detecting module 120 may determine a node in the representation of the semiconductor circuit and/or the 3D semiconductor device that is not connected to a power source or the ground as the sensitive node.

As another example, when the semiconductor circuit corresponds to a master/slave flip-flop, the sensitive node detecting module 120 may determine the sensitive node in the representation of the semiconductor circuit and/or the 3D semiconductor device in consideration of a cross-correlation between various statuses of an input unit, a clock, an output unit, an internal node and the like.

As still another example, when the semiconductor circuit corresponds to a sequential circuit, the sensitive node detecting module 120 may determine a node in the representation of the semiconductor circuit and/or the 3D semiconductor device that is not connected to a power source or the ground as the sensitive node, or may determine a node on a clocking path as the sensitive node.

However, the scope of the present inventive concepts is not limited to these examples, and the sensitive node detecting module 120 may appropriately determine the sensitive node in the representation of the semiconductor circuit and/or the 3D semiconductor device according to the type or function of the semiconductor circuit based on the layout and netlist information 10.

The sensitive region detecting module 130 detects a sensitive region in the representation of the semiconductor circuit and/or the 3D semiconductor device corresponding to a target region for measuring the charge quantity from the layout and netlist information 10.

For example, if and/or when the semiconductor circuit and/or the 3D semiconductor device includes a FinFET semiconductor device, since only the charges deposited on the fin region are absorbed by a drain node, the sensitive region detecting module 130 may determine a sensitive region in the representation of the semiconductor circuit and/or the 3D semiconductor device, in which the region for measuring the charge quantity is approximately set, from the layout and the radial distribution profile of the ions in the representation of the semiconductor circuit and/or the 3D semiconductor device (using, for example, the layer positions of fins/nanowires and the like).

The simulation environment generating module 140 may generate a 3D simulation environment 20 required to perform a particle strike simulation for the sensitive node or the sensitive region. The simulation environment may include a 3D representation of the semiconductor circuit and/or the 3D semiconductor device according to the design of the semiconductor circuit and/or the 3D semiconductor device, respectively.

The simulation environment 20 may include and/or be based on at least one of FEOL layer information, MOL layer information, and BEOL layer information.

For example, the MOL layer information or the BEOL layer information may include information on constituent materials, area, thickness, height, position and the like for inter-layer dielectrics (ILD), metal lines, vias, contacts of the semiconductor circuit and/or the 3D semiconductor device and the like, but the present inventive concepts are not limited thereto.

Meanwhile, for example, the FEOL layer information may include information on a profile (for example, shape, thickness, height, etc.) for a fin region, a nanowire region, a nanosheet region, or an isolated region of the semiconductor circuit and/or the 3D semiconductor device, but the present inventive concepts are not limited thereto.

Such information may be used to apply the Monte-Carlo simulation technique which will be described below.

The simulation environment 20 generated from the simulation environment generating module 140 may be provided to the particle strike simulation module 200.

Figure 3:
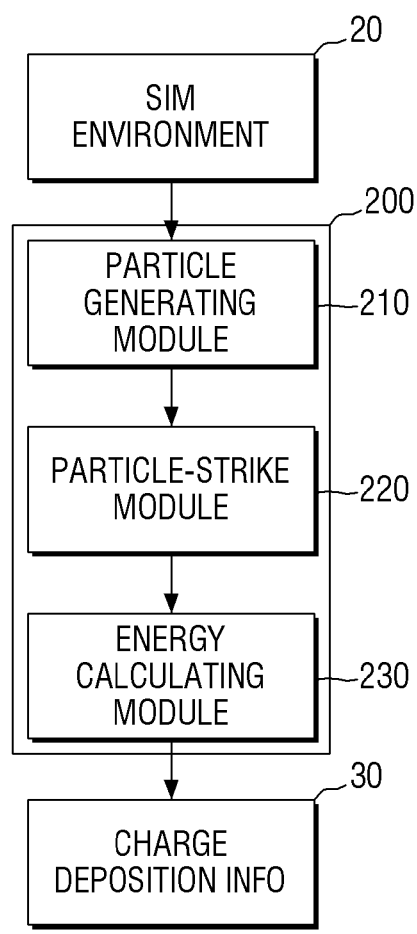
FIG. 3 is a block diagram explaining a particle strike simulation module of the simulation system according to some example embodiments of the present inventive concepts.
Figure 4:
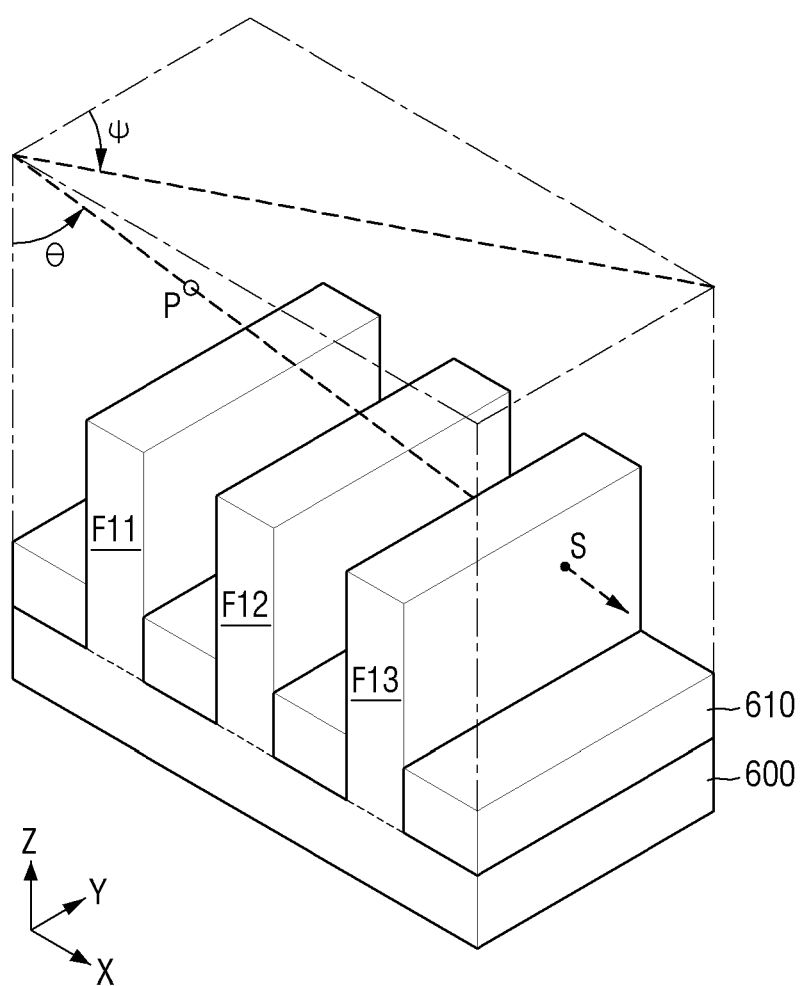
FIG. 4 is a flowchart illustrating an operation of the particle strike simulation module of the simulation system according to some example embodiments of the present inventive concepts.
Figure 5:
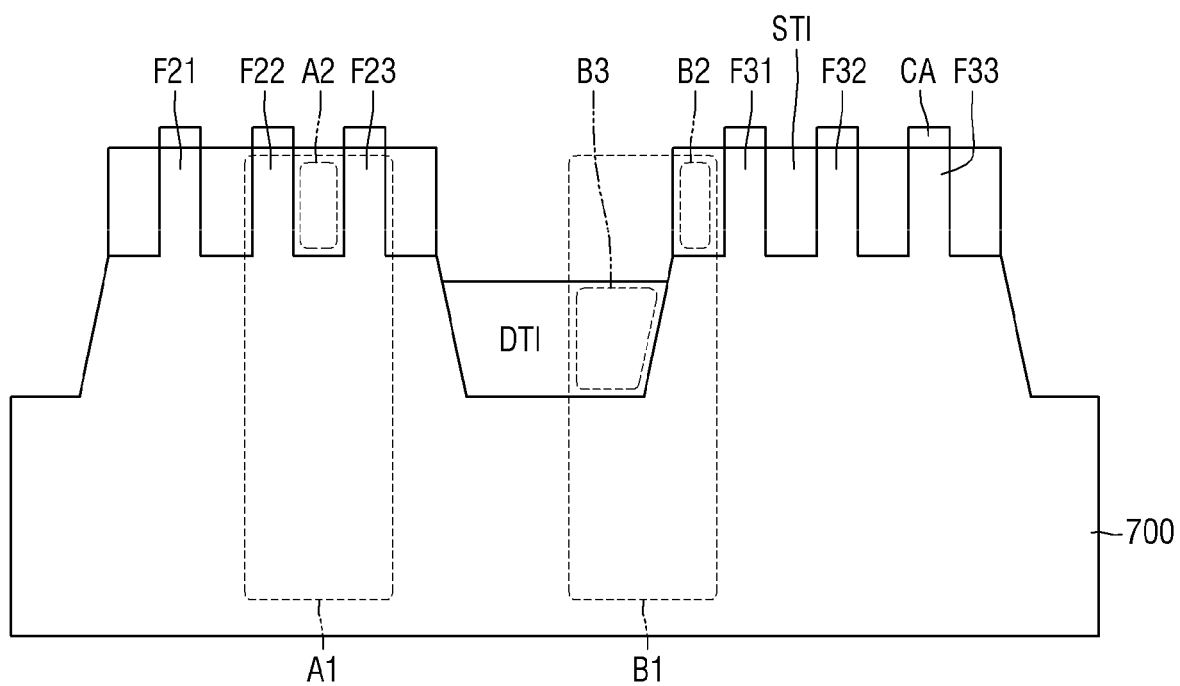
FIG. 5 is a diagram explaining an operation of the particle strike simulation module of the simulation system according to some example embodiments of the present inventive concepts.

FIG. 3 is a block diagram explaining the particle strike simulation module of the simulation system according to some example embodiments of the present inventive concepts. FIG. 4 is a flowchart illustrating an operation of the particle strike simulation module of the simulation system according to some example embodiments of the present inventive concepts. FIG. 5 is a diagram explaining another operation of the particle strike simulation module of the simulation system according to some example embodiments of the present inventive concepts. The modules shown and described with reference to FIGS. 3-5 may be included in the simulation system 1 shown in FIG. 1.

Referring to FIG. 3, the particle strike simulation module 200 of the simulation system 1 according to some example embodiments of the present inventive concepts includes a particle generating module 210, a particle strike module 220, and an energy calculating module 230.

The particle generating module 210 may generate simulated particles for the particle strike simulation (e.g., the particle generating module 210 may representations particles in the simulation environment). Specifically, the particle generating module 210 sets the position and velocity of alpha particles or neutrons and determines the initial position thereof in the simulation environment.

For example, the particle generating module 210 assumes that a large volume, i.e., a particle emission volume, exists in the vicinity of the representation of the semiconductor circuit and/or the 3D semiconductor device in the simulation environment, and generates a plurality of particles having randomly distributed positions and velocity vectors in the simulation environment.

For example, the number of simulated particles, on which the simulation is to be performed, may be determined randomly, for example, by the following equation (1):

$$f(k; \lambda) = \frac{\lambda^k e^{-\lambda}}{k!} \qquad (1)$$

where $\lambda$ is the average number of particles.

In some example embodiments of the present inventive concepts, in the case of alpha particles, the simulated alpha particles may be set to follow a uniform random distribution of position (x, y) and velocity vector ($\theta$, $\varphi$). Further, in some example embodiments of the present inventive concepts, in the case of neutrons, reactants (e.g., Mg, Al, He) may be set to have randomly distributed positions and velocity vectors (x, y, z, $\theta$, $\varphi$).

However, not all of the plurality of particles may strike the representation of the semiconductor circuit and/or the 3D semiconductor device. In addition, some of the particles that strike the representation of the semiconductor circuit and/or the 3D semiconductor device may cause a collision, in the representation, outside the sensitive node or the sensitive region.

The simulation method and system according to some example embodiments of the present inventive concepts have a primary interest in the simulated particles that strike the representation of the semiconductor circuit and/or the 3D semiconductor device in the sensitive node or the sensitive region determined by the sensitive node detecting module 120 or the sensitive region detecting module 130. With respect to only those simulated particles, the energy calculating module 230, which will be described later, may calculate the energy distribution after the strike.

Referring to FIG. 5, the semiconductor circuit and/or 3D semiconductor device represented in the simulation environment according to a design of the semiconductor circuit and/or the 3D semiconductor device may include a substrate 700 and a plurality of fins F21 to F23 and F31 to F33, and a shallow trench isolation (STI) may be formed between the fins F21 to F23 and F31 to F33. Meanwhile, a deep trench isolation (DTI) may be formed to separate the semiconductor circuit and/or the 3D semiconductor device including the fins F21 to F23 from the semiconductor circuit and/or the 3D semiconductor device including the fins F31 to F33.

The sensitive region, on which the charge quantity measurement is to be performed, may be set as an area excluding an area A2 corresponding to the STI from an area A1. Further, the sensitive region may be set as an area excluding an area B2 corresponding to the STI and an area B3 corresponding to the DTI from an area B1.

In some example embodiments of the present inventive concepts, the particle generating module 210 may generate simulated particles that follow the Poisson distribution, but the present inventive concepts are not limited thereto.

The particle strike module 220 may cause the simulated alpha particles or neutrons generated by the particle generating module 210 to strike the 3D representation of the semiconductor circuit and/or the 3D semiconductor device.

Referring also to FIG. 4, the semiconductor circuit and/or 3D semiconductor device represented in the simulation environment may include a substrate 600, an insulating film 610, and a plurality of fins F11, F12 and F13.

The simulated particle P generated in the particle strike module 220 is initialized to have a position (x, y, z) and a velocity vector (θ, φ), and may be simulated to strike the 3D representation of the fin F13 of the representation of the semiconductor circuit and/or the 3D semiconductor device in the simulation environment. The simulated particle P having struck the fin F13 may pass through the fin F13 through a point S.

As for the particles passing through the representation of the material of the semiconductor circuit and/or the 3D semiconductor device, the simulation may be performed using a toolkit such as GEANT4 (https://geant4.web.cern.ch), but the present inventive concepts are not limited thereto.

Thereafter, the energy calculating module 230 calculates the energy distribution after the simulated alpha particles or neutrons strike the representation of the semiconductor circuit and/or the 3D semiconductor device in the simulation environment, and provides the calculation result as charge deposition information 30 to the charge collection simulation module 300. The charge deposition may be used to calculate a predicted SER value (also referred to herein as an SER prediction result value) associated with the design of the semiconductor circuit and/or the 3D semiconductor device.

The energy of the particles lost in the BEOL layer and the energy accumulated in the FEOL layer can be calculated by using a Linear Energy Transfer (LET) model. The energy calculating module 230 uses a position-dependent LET model, such as the following equation (2), which uses different parameters for various particles or materials.

$$-\int_{E_i}^{E_o} \frac{dE}{LET(E)} = \int dl \qquad (2)$$

The energy of the particles lost in the BEOL layer may be used to calculate the initial energy in the FEOL layer. Because the position and velocity vector of the particles are randomly distributed, the energy of the particles that strike the FEOL layer is also randomly distributed.

Figure 6:
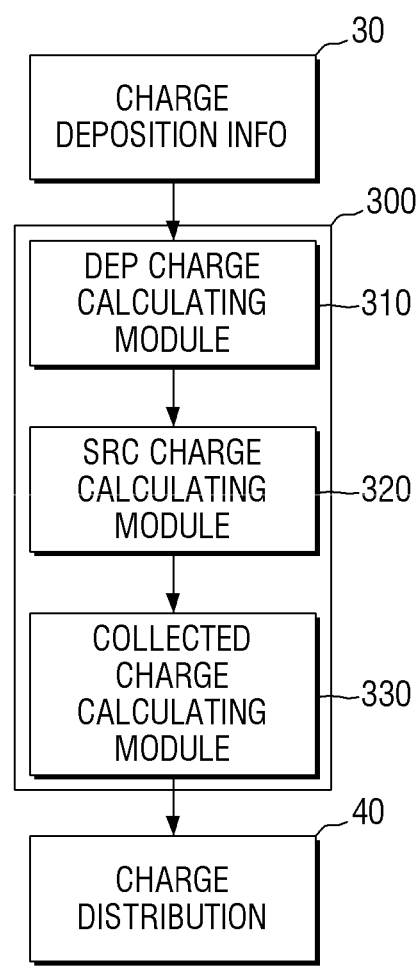
FIG. 6 is a block diagram illustrating a charge collection simulation module of the simulation system according to some example embodiments of the present inventive concepts.
Figure 7:
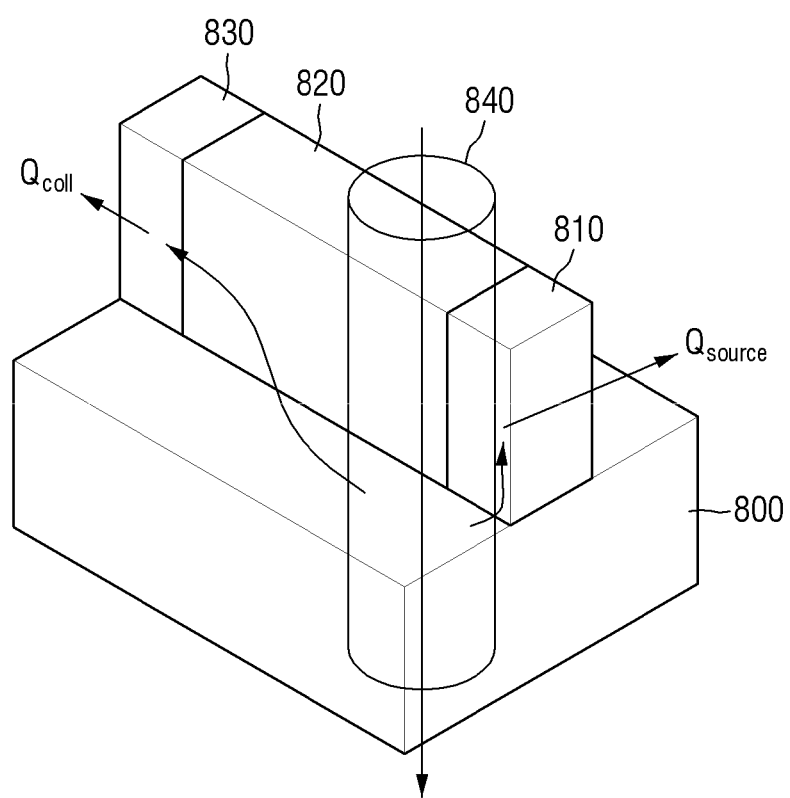
FIG. 7 is a diagram explaining the charge quantity calculated by the charge collection simulation module of FIG. 6.

FIG. 6 is a block diagram illustrating the charge collection simulation module of the simulation system according to some example embodiments of the present inventive concepts. FIG. 7 is a diagram explaining the charge quantity calculated by the charge collection simulation module of FIG. 6. The modules shown and described with reference to FIGS. 6-7 may be included in the simulation system 1 shown in FIG. 1.

Referring to FIG. 6, the charge collection simulation module 300 of the simulation system 1 according to some example embodiments of the present inventive concepts includes a deposited charge calculating module 310, a source charge calculating module 320, and a collected charge calculating module 330.

The deposited charge calculating module 310 calculates a first deposited charge quantity $Q_{dep}$ for the sensitive node (drain node) in the representation of the semiconductor circuit and/or 3D semiconductor device from the charge deposition information 30 provided from the particle strike simulation module 200.

The first deposited charge quantity $Q_{dep}$ can be calculated by the following equation (3):

$$Q_{dep} = \frac{\lambda q}{E_p} \int_0^{z_o} LET(z)dz \int_{FIN} \int_L R(x, y)dxdy \qquad (3)$$

where λ is a normalization constant, $E_p$ is the energy required to produce an e-h pair (e.g., 3.6 eV), q is an elementary charge, LET is the linear energy transfer, $z_o$ is the distance traveled by the particle in the fin region, and R(x, y) is the radial distribution of the e-h pair. R(x, y) can be approximated by using a toolkit such as GEANT4 (https://geant4.web.cern.ch).

The first deposited charge quantity $Q_{dep}$ is the total quantity of charges deposited in the fin region, the nanowire region, or the nanosheet region. As described above, the simulation method and system according to some example embodiments of the present inventive concepts calculate the charge quantity only for the fin region, the nanowire region, or the nanosheet region without calculating the charge quantity for the regions such as STI and DTI.

Next, the source charge calculating module 320 calculates a second deposited charge quantity $Q_{source}$ for the source node in the representation of the semiconductor circuit and/or 3D semiconductor device from the charge deposition information 30 provided from the particle strike simulation module 200.

The second deposited charge quantity $Q_{source}$ can be calculated by the following equation (4):

$$Q_{source} = \frac{\lambda q}{E_p} \int_0^{z_o} LET(z)dz \int_{TSD} \int_{LSD} R(x, y)dxdy \qquad (4)$$

Then, the collected charge calculating module 330 calculates a total collected charge quantity $Q_{coll}$ from the first deposited charge quantity $Q_{dep}$ and the second deposited charge quantity $Q_{source}$ by the following equation (5):

$$Q_{coll} = Q_{dep} - Q_{source} \qquad (5)$$

Referring also to FIG. 7, the first deposited charge quantity $Q_{dep}$ corresponds to the charge quantity in a region indicated by a cylinder 840 in FIG. 7, and the second deposited charge quantity $Q_{source}$ corresponds to the quantity of charges deposited for a source 810 in the cylinder 840. The total collected charge quantity $Q_{coll}$ calculated by the above equation (5) corresponds to the quantity of charges collected for a drain 830.

The accuracy of the calculation of the total collected charge quantity $Q_{coll}$ can be increased by more precisely setting the simulation environment described above. For example, as the simulation environment generating module 140 generates a more sophisticated simulation environment in consideration of fin thickness, height, shape, pitch, channel length, width of source and drain, distribution of isolation regions (e.g., STI, DTI, etc.), the accuracy of the calculation of the total collected charge quantity $Q_{coll}$ can be increased.

Figure 8:
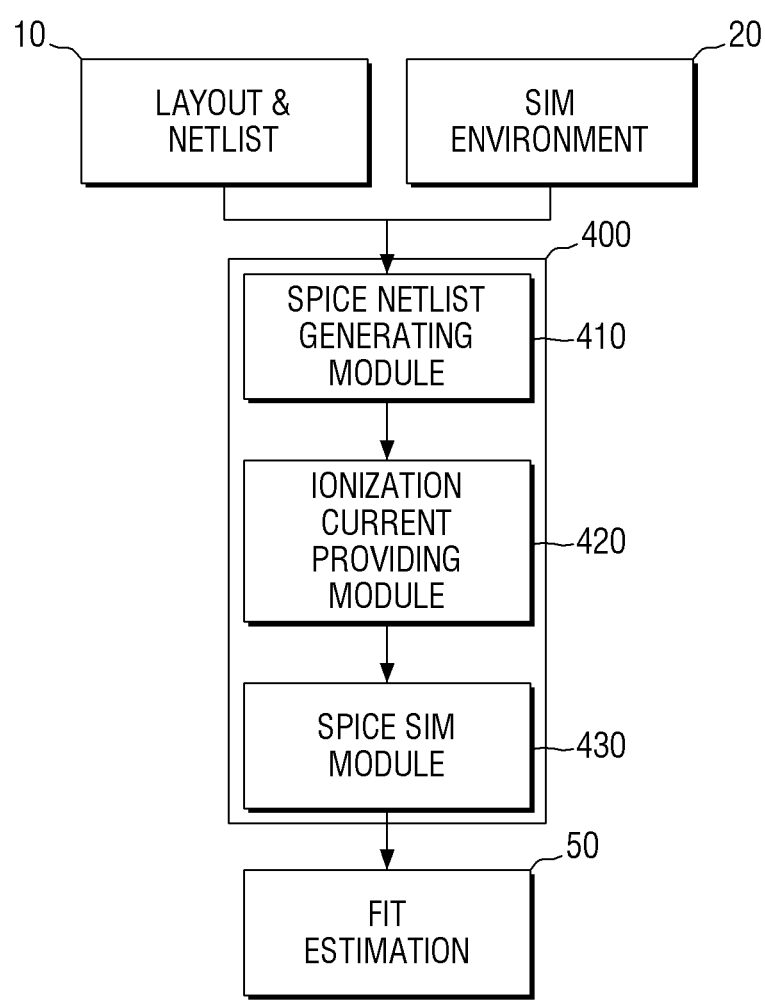
FIG. 8 is a block diagram illustrating a SPICE module of the simulation system according to some example embodiments of the present inventive concepts.

FIG. 8 is a block diagram illustrating the SPICE module of the simulation system according to some example embodiments of the present inventive concepts. The modules shown and described with reference to FIG. 8 may be included in the simulation system 1 shown in FIG. 1.

Referring to FIG. 8, the SPICE module 400 of the simulation system 1 according to some example embodiments of the present inventive concepts includes a SPICE netlist generating module 410, an ionization current providing module 420, and a SPICE simulation module 430.

The SPICE netlist generating module 410 receives the layout and netlist information 10 and the simulation environment 20, and generates a SPICE netlist.

The ionization current providing module 420 provides the ionization current information to the SPICE simulation module 430. The SPICE simulation module 430 performs the SPICE simulation based on the SPICE netlist and the ionization current information to estimate Failure-In-Time (FIT).

Figure 9:
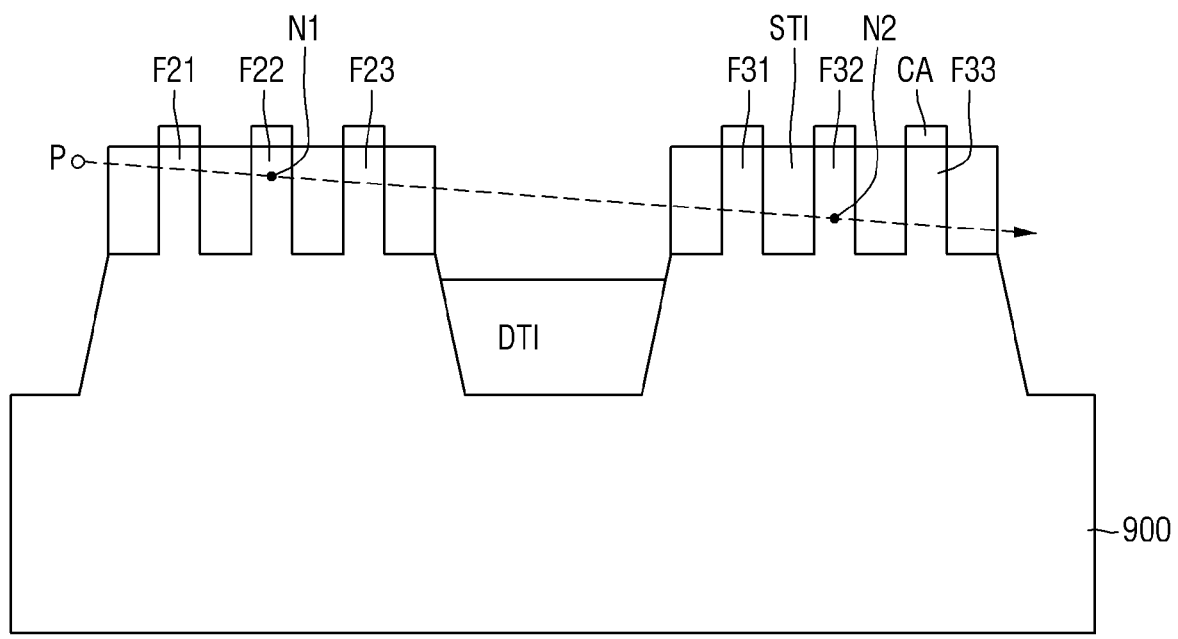
FIG. 9 is a diagram for explaining another operation of the charge collection simulation module of the simulation system according to some example embodiments of the present inventive concepts.

FIG. 9 is a diagram for explaining another operation of the charge collection simulation module of the simulation system according to some example embodiments of the present inventive concepts.

Referring to FIG. 9, the semiconductor device and/or the 3D semiconductor device represented in the simulation environment includes a substrate 900 and a plurality of fins F21 to F23 and F31 to F33, and a shallow trench isolation (STI) may be formed between the fins F21 to F23 and F31 to F33. Meanwhile, a deep trench isolation (DTI) may be formed to separate the semiconductor circuit and/or 3D semiconductor device including the fins F21 to F23 from the semiconductor circuit and/or 3D semiconductor device including the fins F31 to F33.

The sensitive node including the fin F22 is referred to as a first sensitive node N1, and the sensitive node including the fin F32 is referred to as a second sensitive node N2. One particle P generated by the particle strike module 220 may pass through the first sensitive node N1 and the second sensitive node N2.

In this case, the charge collection simulation module 300 of the simulation system according to some example embodiments of the present inventive concepts calculates the total collected charge quantity and the current for each of the sensitive nodes N1 and N2 by using equation (5).

In this case, the SPICE module 400 may perform the SPICE simulation by using the calculated current information, i.e., a plurality of current sources for each of the sensitive nodes N1 and N2.

FIGS. 10A to 10D are diagrams explaining some example embodiments of the simulation environment of the simulation system according to some example embodiments of the present inventive concepts. The modules shown and described with reference to FIGS. 10A-10D may be included in the simulation system 1 shown in FIG. 1.

Figure 10A:
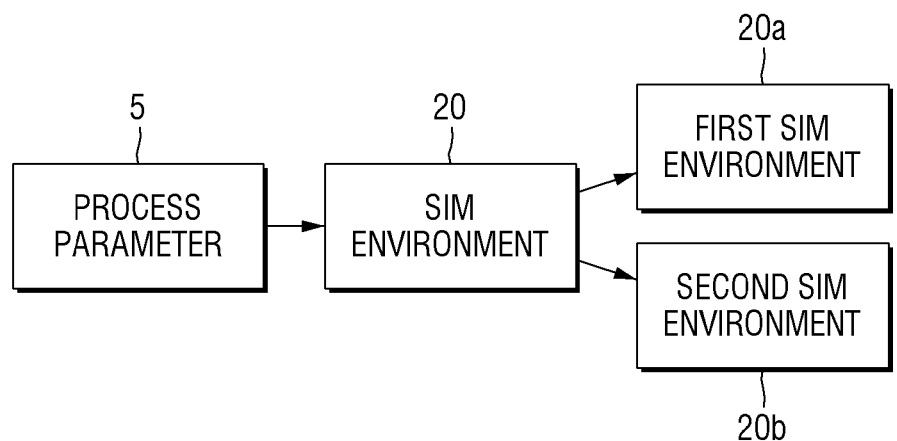
FIGS. 10A-10D are diagrams explaining a simulation environment of the simulation system according to some example embodiments of the present inventive concepts.

Referring to FIG. 10A, the simulation system according to some example embodiments of the present inventive concepts may reflect variability for the SER.

Specifically, the preprocessing module 100 of the simulation system according to some example embodiments of the present inventive concepts may receive the variability in the semiconductor manufacturing process from the user and generate a plurality of simulation environments 20*a* and 20*b* for reflecting the variability in the simulation.

In some example embodiments of the present inventive concepts, the variability in the semiconductor manufacturing process may be provided numerically as a process parameter 5. The preprocessing module 100, specifically, the simulation environment generating module 140 may generate the 3D simulation environment 20 necessary to perform the particle strike simulation for the sensitive node or the sensitive region, and then generate, for example, the first simulation environment 20*a* and the second simulation environment 20*b* that reflect the process parameter 5 received from the user.

In some example embodiments of the present inventive concepts, the process parameter 5 may have a distribution that is not limited to the scope of the present inventive concepts. The first simulation environment 20*a* may be generated by reflecting a first process parameter having a first value in the distribution, and the second simulation environment 20*b* may be generated by reflecting a second process parameter having a second value different from the first value in the distribution.

Figure 10B:
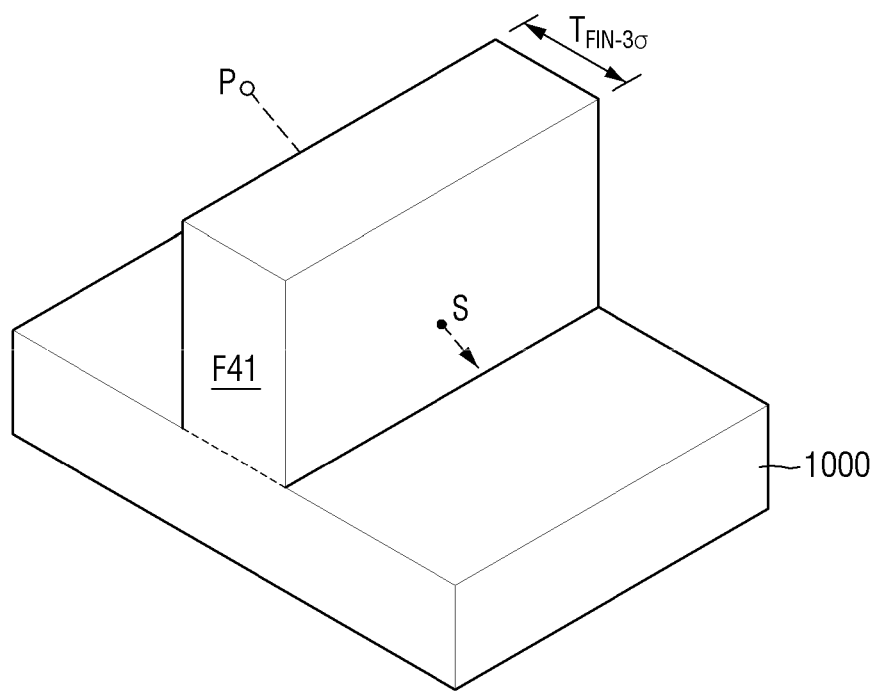
Figure 10C:
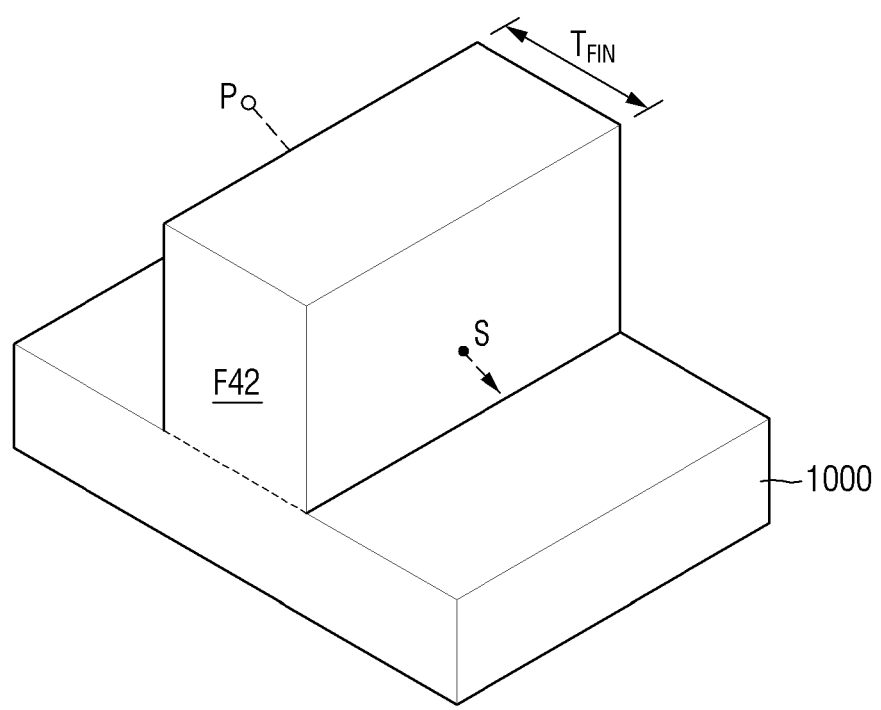
Figure 10D:
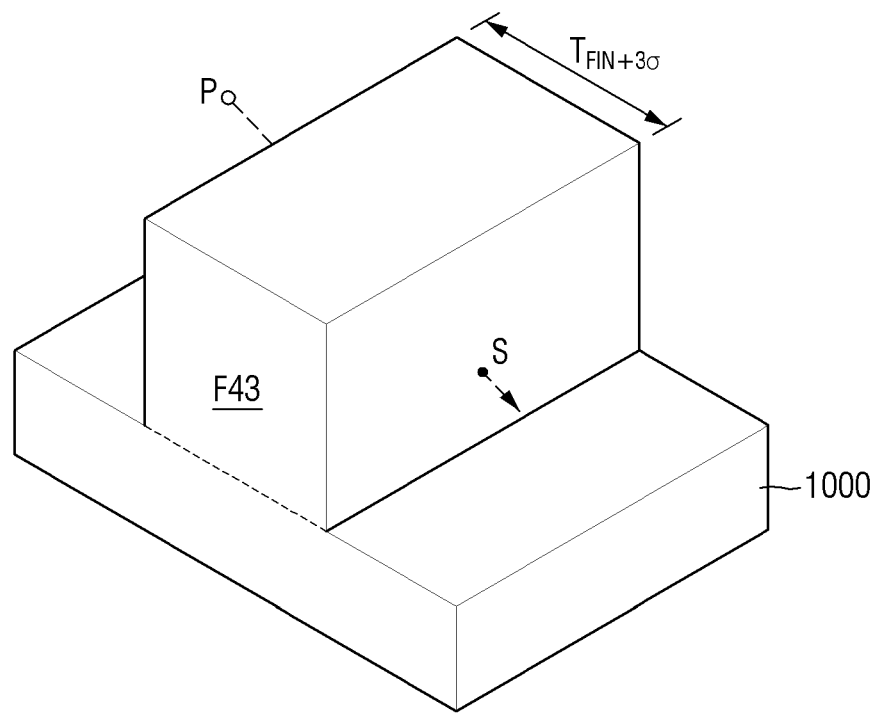

Referring to FIGS. 10B to 10D, suppose that ±3σ has been received from the user as a process variation value for the thickness of the fin of a semiconductor circuit and/or 3D semiconductor device. In this case, the simulation system according to some example embodiments of the present inventive concepts can automatically generate a plurality of simulation environments including different representations of the semiconductor circuit and/or 3D semiconductor device having different fin thicknesses. For example, in this case, the simulation system according to some example embodiments of the present inventive concepts may generate a first simulation environment that reflects the thickness $T_{FIN-3\sigma}$ of the fin of FIG. 10B, a second simulation environment that reflects the thickness $T_{FIN}$ of the fin of FIG. 10C, and a third simulation environment that reflects the thickness $T_{FIN+3\sigma}$ of the fin of FIG. 10D. Thereafter, the simulation system according to some example embodiments of the present inventive concepts can perform more in-depth and various simulations such as an average simulation or a worst-case simulation by using the first to third simulation environments.

According to the above-described embodiments of the present inventive concepts, it is possible to increase the accuracy of the SER prediction for semiconductor circuits and/or 3D semiconductor devices, thereby enabling the manufacture of semiconductor circuits and/or 3D semiconductor devices configured to experience reduced data loss due to a soft error caused by cosmic rays and radioactive emission (e.g., semiconductor circuits and/or 3D semiconductor devices configured to have improved resistance to soft errors).

Figure 11:
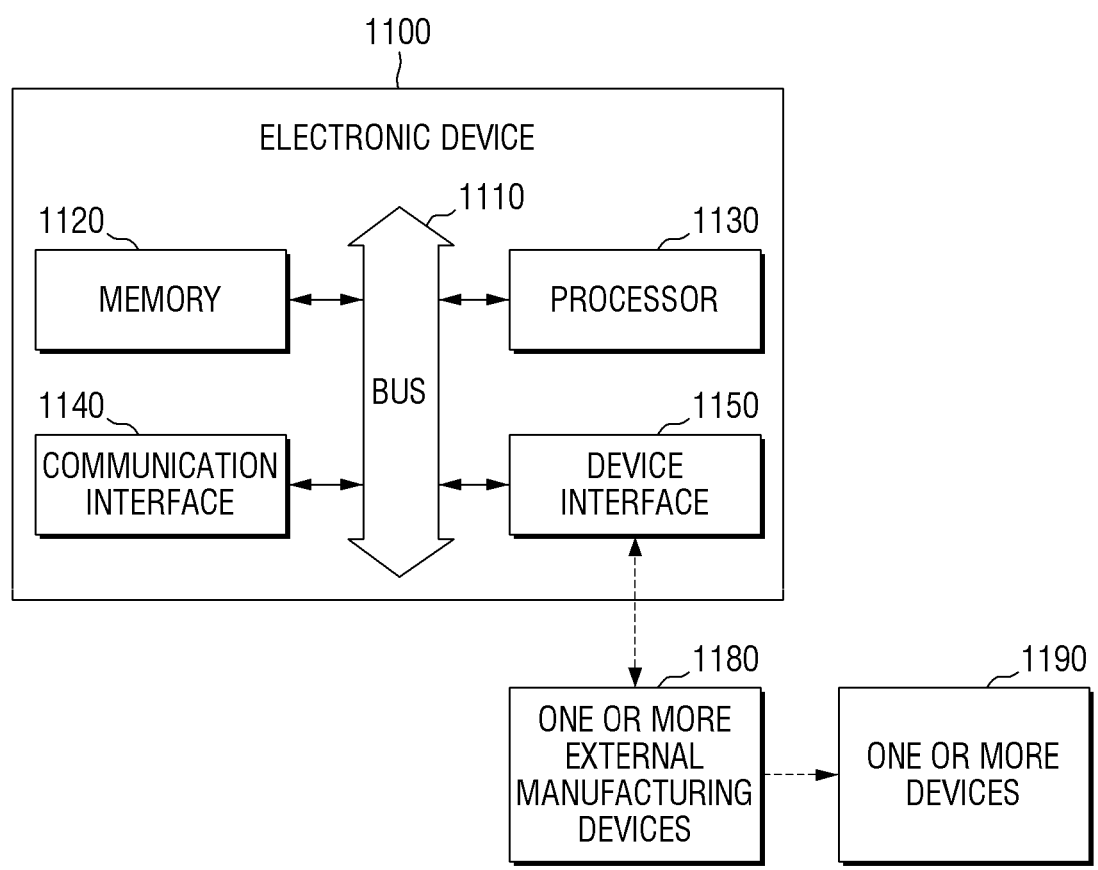
FIG. 11 is a diagram illustrating an electronic device according to some example embodiments.

FIG. 11 is a diagram illustrating an electronic device 1100 according to some example embodiments.

Referring to FIG. 11, the electronic device 1100 includes a memory 1120, a processor 1130, a communication interface 1140, and a device interface 1150.

The electronic device 1100 may be included in one or more various electronic devices. In some example embodiments, the electronic device 1100 may include a computing device. A computing device may include a personal computer (PC), a tablet computer, a laptop computer, a netbook, some combination thereof, or the like. The memory 1120, the processor 1130, the communication interface 1140, and the device interface 1150 may communicate with one another through a bus 1110.

In some example embodiments, one or more of the memory 1120, the processor 1130, the communication interface 1140, and the device interface 1150 may include one or more of the semiconductor circuits and/or 3D semiconductor devices as described herein.

The communication interface 1140 may communicate data from an external device using various Internet protocols. The external device may include, for example, a computing device.

The processor 1130 may execute a program and control the electronic device 1100. A program code to be executed by the processor 1130 may be stored in the memory 1120. An electronic system may be connected to an external device through an input/output device (not shown) and exchange data with the external device.

The memory 1120 may store information. The memory 1120 may be a volatile or a nonvolatile memory. The memory 1120 may be a non-transitory computer readable storage medium. The memory may store computer-readable instructions that, when executed, cause the execution of one or more methods, functions, processes, etc. as described herein. In some example embodiments, the processor 1130 may execute one or more of the computer-readable instructions stored at the memory 1120.

In some example embodiments, the communication interface 1140 may include a USB and/or HDMI interface. In some example embodiments, the communication interface 1140 may include a wireless communication interface.

In some example embodiments, an apparatus may include some or all of the elements described herein. For example, an apparatus may include the memory device 1000 described above. In another example, an apparatus may include some or all of the electronic device 1100. An apparatus may include one or more of the logic circuits described herein.

As shown in FIG. 11, in some example embodiments device interface 1150 may be configured to communicatively couple with one or more external manufacturing devices 1180. Such one or more external manufacturing devices 1180 may be configured to manufacture one or more devices 1190. Such one or more devices 1190 that may be manufactured by the one or more external manufacturing devices 1180 may include one or more semiconductor circuits and/or 3D semiconductor devices as described herein with regard to the simulation system 1. Such one or more devices 1190 that may be manufactured by the one or more external manufacturing devices 1180 may include one or more electronic devices, including one or more devices including some or all of the elements of electronic device 1100.

In some example embodiments, electronic device 1100 may be configured to implement the simulation system as described herein, in whole or in part, with regard to a design of a semiconductor circuit and/or semiconductor device.

In some example embodiments, based on the SER prediction result obtained as a result of implementing the simulation system, the electronic device 1100 may modify the design of the semiconductor circuit and/or the 3D semiconductor device and/or the design of an electronic device in which the semiconductor circuit and/or the 3D semiconductor device is located. For example, where the SER prediction result indicates that a 3D semiconductor device design is excessively vulnerable to particle-strike induced soft errors (e.g., the MIT and/or MTBF values at least meet threshold values, respectively), the 3D semiconductor device design may be modified, and the simulation and SER prediction result obtainment provided by the simulation system 1 may be re-executed based on information indicating the modified design (e.g., layout and netlist information indicating the modified design). Modification of the design may include adjusting one or more process parameters, process variation values, etc. associated with the design, as described below. Modification of the design may include adjusting one or more dimensional parameters and/or configurations of one or more structural elements (e.g., fins) of the semiconductor circuit and/or 3D semiconductor device as indicated in the design, including a thickness, size, shape, and/or position of one or more elements (e.g., fins) of the semiconductor circuit and/or 3D semiconductor device.

In some example embodiments, upon a determination that a design (e.g., 3D semiconductor device design, semiconductor circuit design, electronic device design, etc.) is sufficiently resistant to particle-strike induced soft errors based on the SER prediction result, the electronic device 1100 may be configured to communicate with one or more external manufacturing devices 1180 to manufacture one or more devices 1190 according to the design. Such one or more devices 1190 may include one or more semiconductor circuits, 3D semiconductor devices, and/or electronic devices including same.

Thus, the electronic device 1100 may enable the manufacturing of semiconductor circuits and/or 3D semiconductor devices having reduced susceptibility to soft errors, thereby enabling the manufacture of semiconductor circuits and/or 3D semiconductor devices, and in some example embodiments electronic devices including same, having reduced susceptibility to soft errors and thus having improved reliability and/or performance.

Although example embodiments of the present inventive concepts have been disclosed for illustrative purposes, those skilled in the art will appreciate that various modifications, additions and substitutions are possible, without departing from the scope and spirit of the inventive concepts as disclosed in the accompanying claims.

What is claimed is:

1. A method comprising:
    receiving layout and netlist information associated with a design of a semiconductor circuit, the semiconductor circuit including a three-dimensional (3D) semiconductor device;
    generating a simulation environment based on the layout and netlist information, the simulation environment including a representation of the semiconductor circuit according to the design of the semiconductor circuit;
    determining a sensitive node or a sensitive region according to type or function of the semiconductor circuit based on the layout and netlist information;
    performing a particle strike simulation based on the simulation environment to generate charge deposition information associated with the design of the semiconductor circuit;
    calculating a collected charge quantity associated with the sensitive node or the sensitive region based on the charge deposition information; and
    manufacturing the semiconductor circuit based on the collected charge quantity.

2. The method of claim 1, wherein,
    calculating the collected charge quantity includes measuring a charge quantity at the sensitive node.

3. The method of claim 1, wherein,
calculating the collected charge quantity includes measuring a charge quantity at the sensitive region.

4. The method of claim 1, wherein the simulation environment includes front-end-of-line (FEOL) layer information, middle-of-line (MOL) layer information, and/or back-end-of-line (BEOL) layer information.

5. The method of claim 1, wherein,
the simulation environment includes a first simulation environment and a second simulation environment,
the first simulation environment reflects a process parameter associated with the design of the semiconductor circuit having a first value, and
the second simulation environment reflects the process parameter having a second value different from the first value.

6. The method of claim 1, wherein the particle strike simulation is performed based on a Monte-Carlo simulation technique.

7. The method of claim 1, wherein the performing includes setting a position and velocity of simulated alpha particles or neutrons following a Poisson distribution and determining an initial position thereof in the simulation environment.

8. The method of claim 7, wherein the performing includes
causing the simulated alpha particles or neutrons to strike the representation of the semiconductor circuit, and
calculating an energy distribution after the strike.

9. The method of claim 1, wherein the calculating includes
calculating a first deposited charge quantity associated with a drain node of the semiconductor circuit based on the charge deposition information,
calculating a second deposited charge quantity associated with a source node of the semiconductor circuit based on the charge deposition information, and
calculating the collected charge quantity based on the first deposited charge quantity and the second deposited charge quantity.

10. The method of claim 1, wherein the semiconductor device includes a FinFET semiconductor device, a nanowire semiconductor device, and/or a nanosheet semiconductor device.

11. The method of claim 1, further comprising:
receiving the layout and netlist information and the simulation environment;
generating a Simulation Program Integrated Circuit Emphasis (SPICE) netlist;
generating ionization current information; and
performing a SPICE simulation based on the SPICE netlist and the ionization current information to estimate a Failure-In-Time (FIT) associated with the design of the semiconductor circuit.

12. A method, comprising:
receiving layout and netlist information indicating a design of a semiconductor circuit, the semiconductor circuit including a three-dimensional (3D) semiconductor device;
generating a simulation environment based on the layout and netlist information, the simulation environment including a representation of the semiconductor circuit;
determining a sensitive node or a sensitive region according to type or function of the semiconductor circuit based on the layout and netlist information;
performing a particle strike simulation based on the simulation environment to determine a soft error rate (SER) involving the sensitive node or the sensitive region; and
manufacturing the semiconductor circuit according to the design of the semiconductor circuit, based on a determination that the SER is less than a threshold value.

13. The method of claim 12, wherein
determining the SER includes measuring a charge quantity at one of the sensitive node or the sensitive region.

14. The method of claim 12, wherein,
the simulation environment includes a first simulation environment and a second simulation environment,
the first simulation environment reflects a process parameter associated with the design of the semiconductor circuit having a first value, and
the second simulation environment reflects the process parameter having a second value different from the first value.

15. The method of claim 12, wherein the performing includes setting a position and velocity of simulated alpha particles or neutrons following a Poisson distribution and determining an initial position thereof in the simulation environment.

16. The method of claim 15, wherein the performing includes
causing the simulated alpha particles or neutrons to strike the representation of the semiconductor circuit, and
calculating an energy distribution after the strike.

17. A method, comprising:
receiving layout and netlist information indicating a design of a semiconductor circuit, the semiconductor circuit including a three-dimensional (3D) semiconductor device;
generating a simulation environment based on the layout and netlist information, the simulation environment including a representation of the semiconductor circuit;
determining a sensitive node or a sensitive region according to type or function of the semiconductor circuit based on the layout and netlist information;
performing a particle strike simulation based on the simulation environment to determine a soft error rate (SER) involving the sensitive node or the sensitive region;
modifying the design of the semiconductor circuit to establish a modified design, and generating information indicating the modified design, based on a determination that the SER at least meets a threshold value;
implementing the generating and the performing, based on the information indicating the modified design, to determine a SER associated with the modified design; and
manufacturing the semiconductor circuit according to the modified design, based on a determination that the SER associated with the modified design is less than the threshold value.

18. The method of claim 17, wherein,
the modifying includes adjusting a value of one or more process parameters, process variation values, and/or dimensional parameters associated with one or more structural elements of the semiconductor circuit in the design.

19. The method of claim 17, wherein,
determining the SER includes measuring a charge quantity at one of the sensitive node or the sensitive region.

20. The method of claim 17, wherein the performing includes setting a position and velocity of simulated alpha particles or neutrons following a Poisson distribution and determining an initial position thereof in the simulation environment.

* * * * *